Patented Dec. 1, 1953

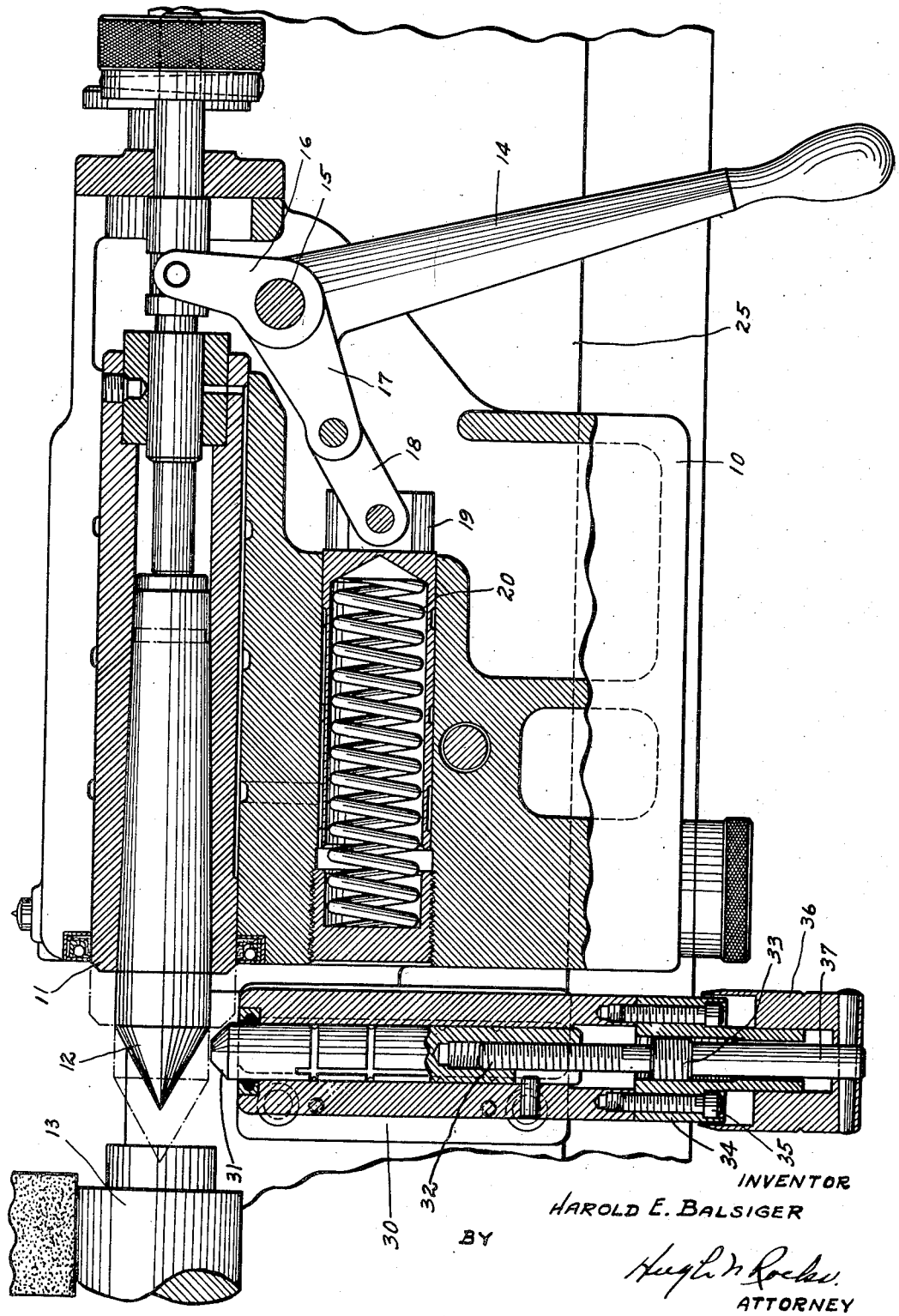

2,660,842

UNITED STATES PATENT OFFICE 2,660,842

PRECISION FEED ADJUSTMENT

Harold E. Balsiger, Waynesboro, Pa., assignor to Landis Tool Company, Waynesboro, Pa.

Application June 7, 1950, Serial No. 166,559

5 Claims. (Cl. 51—236)

This invention relates to machine tools, particularly to means for supporting a work piece against the action of a cutting tool.

The usual practice in supporting a work piece during a grinding operation is to place one or more work rests at points intermediate the ends of the work piece. For ordinary tolerances, this method has been satisfactory. However, with the demand for more rigid tolerances, it has been found that the end portitons of the work piece, particularly at the footstock end are difficult to keep ground straight and to size, partly because of deflection of the footstock center and spindle caused by pressure of the tool against work. Another source of inaccuracy is in the clearance between sliding parts resulting from a dull cutting edge.

It is, therefore, an object of this invention to provide means for supporting the end portion of a work piece during a machining operation.

A further object is to provide a supporting device for the footstock spindle.

A further object is to provide means for controlling the size and shape of a work piece.

The drawing shows a conventional footstock with a back rest mounted to support the footstock center during a machining operation.

Numeral 10 indicates the footstock base; 11, a hollow spindle slidably mounted in said base and supporting a footstock center 12. Said spindle and center function as a unit and are moved toward and from operative relation with work piece 13 by means of a lever 14 pivotally mounted at 15 and having a yoke portion 16 acting through suitable connections to shift spindle 11.

Another extension 17 of said lever is connected through link 18 to a plunger 19 actuated by spring 20. In the position shown, lever 14 through the connection between extension 17 and link 18 is held locked. A slight movement of lever 14 in a counterclockwise direction will release the lock so that spring 20 may continue the movement of said lever in said direction to hold center 12 in engagement with the work piece.

The means for supporting spindle 11 consists of a base 30, on which is slidably mounted a work or footstock center engaging member 31. An actuating screw 32 is threaded into said work engaging member. Said screw extends beyond the end of said work engaging member and has another threaded portion 33 of a different pitch. Said portion 33 is threaded in a collar 34 secured to base 30 by means of screws 35. A graduated knob 36 is secured to an unthreaded portion 37, of which the threaded portion 33 is a part. The footstock base 10 and the rest base 30 are mounted on a work carriage 25.

While it is generally preferred to apply a steady rest directly to the portion of the work piece to be ground in the case of plunge grinding, in the case of grinding an end portion several conditions are present which do not enter into the grinding of intermediate portions of a work piece as indicated above. The grinding of an end portion of a work piece is affected by the resiliency of the footstock center and the necessary clearance between sliding parts. These conndition may be compensated for by applying a steady rest to the footstock center to prevent springing thereof and also to take up the clearance between sliding parts. The application of the steady rest to the footstock center has one outstanding advantage over its application to the part being ground in that the center does not rotate and therefor there is no problem of wear of the work or footstock engaging member of the steady rest. The footstock center support has an additional advantage in that since there is no stock removal, no adjustment is required during a grinding operation and the risk of making improper adjustment of the steady rest on the portion being ground is thereby avoided.

I claim:

1. In a machine tool carriage, means for rotatably supporting one end of a workpiece during a machining operation including a footstock, a spindle in said footstock having a center member for engaging one end of said work piece, means mounted on said carriage independently of said footstock for engaging and supporting said center against deflection due to said machining operation and precision means for adjusting said supporting means to effect a fine precision feed of said work piece against said cutting tool.

2. A method for controlling the grinding of the end portion of a work piece which consists in rotatably supporting said work piece between centers of a headstock and a footstock, placing a steady rest in position to engage one of said centers, adjusting said steady rest to counteract deflection of said center and to take up clearance between the spindle and bearing supporting said center, grinding said end portion and maintaining said steady rest adjustment unchanged during the grinding of said end portion to size.

3. A method for controlling the grinding of the end portion of a work piece which consists in rotatably supporting said work piece between centers of a headstock and footstock, placing a steady rest in position to engage one of said centers, adjusting said steady rest to counteract deflection of said center, and to take up clearance between the spindle and bearing supporting said spindle, grinding said end portion and adjusting said steady rest against said center to feed the work piece against the grinding wheel until said end portion is ground to size.

4. The method of preventing the grinding of tapered surfaces on the end portion of a work piece which consists in placing a steady rest in position to engage a footstock center member, adjusting said steady rest in a direction opposed to that of the grinding feed to counteract deflection of the footstock center and to take up clearance between sliding parts, and grinding said end portion with said steady rest fixed in said adjusted position.

5. The method of preventing the grinding of a tapered surface on the end portion of a work piece which consists in placing a steady rest in position to engage a footstock center, adjusting said steady rest to counteract deflection of the footstock center and to take up clearence between said sliding parts, grinding said end portion and maintaining said adjustment unchanged during the grinding thereof and adjusting said steady rest after the grinding feed has stopped, if necessary to correct taper or oversize.

HAROLD E. BALSIGER.

References Cited in the file of this patent

UNITED STATES PATENTS

| Number | Name | Date |
|---|---|---|
| 1,119,030 | Norton | Dec. 1, 1914 |
| 1,290,896 | Bryant | Jan. 14, 1919 |
| 1,938,759 | Ernst | Dec. 12, 1933 |
| 2,404,613 | Belden et al. | July 23, 1946 |